United States Patent
Bakan et al.

(10) Patent No.: US 11,940,028 B2
(45) Date of Patent: Mar. 26, 2024

(54) FLEXIBLE WET FRICTION MATERIALS INCLUDING SILANES

(71) Applicant: SCHAEFFLER TECHNOLOGIES AG & CO. KG, Herzogenaurach (DE)

(72) Inventors: Murat Bakan, Wooster, OH (US); Rashid Farahati, Copley, OH (US); Jung-Feng Hu, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 637 days.

(21) Appl. No.: 16/363,728

(22) Filed: Mar. 25, 2019

(65) Prior Publication Data

US 2020/0309220 A1 Oct. 1, 2020

(51) Int. Cl.
*F16D 69/02* (2006.01)
*D06M 11/79* (2006.01)
*D06M 13/513* (2006.01)
*D06M 15/41* (2006.01)
*D06M 101/16* (2006.01)
(Continued)

(52) U.S. Cl.
CPC .......... *F16D 69/026* (2013.01); *D06M 11/79* (2013.01); *D06M 13/513* (2013.01); *D06M 15/41* (2013.01); *F16D 69/023* (2013.01); *D06M 2101/16* (2013.01); *D06M 2101/40* (2013.01);
(Continued)

(58) Field of Classification Search
CPC combination set(s) only.
See application file for complete search history.

(56) References Cited

U.S. PATENT DOCUMENTS 5,775,468 A 7/1998 Lam et al.
6,667,103 B1 * 12/2003 Mori ................... C08L 83/08
428/391
(Continued)

FOREIGN PATENT DOCUMENTS

JP H03103487 A 4/1991
JP H09291271 A 11/1997
(Continued)

OTHER PUBLICATIONS

Published Article in: WEAR an International Journal on the Science and Technology of Friction and Wear Titled: "Effect of Pre-impregnated Organosilicon Layer on Friction and Wear Properties of paper-based Friction Materials" Author: Lu Jinhua et al Date: Jan. 30, 2018.
(Continued)

*Primary Examiner* — Lynda Salvatore
(74) *Attorney, Agent, or Firm* — Davidson, Davidson & Kappel, LLC

(57) ABSTRACT

A method for forming a friction material. The method includes mixing a fibrous base material and filler particles to form a substrate. The method further includes saturating the substrate with a silane solution including a silane to form a uniformly impregnated silane matrix. The method also includes curing the uniformly impregnated silane matrix to form a cured uniformly impregnated silane matrix. The method also includes saturating the cured uniformly impregnated silane matrix with a phenolic resin solution to form a uniformly impregnated silane, phenolic resin matrix. The method also includes curing the uniformly impregnated silane, phenolic resin matrix to form the friction material.

15 Claims, 3 Drawing Sheets

(51) Int. Cl.
     *D06M 101/40*     (2006.01)
     *F16D 69/00*     (2006.01)

(52) U.S. Cl.
     CPC .......... *F16D 2069/007* (2013.01); *F16D 2200/0056* (2013.01); *F16D 2200/0065* (2013.01)

(56) References Cited

U.S. PATENT DOCUMENTS

| | | |
|---|---|---|
| 7,491,664 B2 | 2/2009 | Mori et al. |
| 9,915,331 B2 * | 3/2018 | Farahati ............. F16D 69/026 |
| 2002/0058728 A1 | 5/2002 | Takahara et al. |
| 2004/0043193 A1 * | 3/2004 | Chen ................ F16D 69/026 |
| | | 428/143 |
| 2005/0075414 A1 | 4/2005 | Lam et al. |
| 2011/0189460 A1 | 8/2011 | Chavdar |
| 2013/0225720 A1 | 8/2013 | Kimura et al. |
| 2017/0159738 A1 | 6/2017 | Farahati et al. |
| 2017/0261057 A1 | 9/2017 | Farahati et al. |

FOREIGN PATENT DOCUMENTS

| | | |
|---|---|---|
| JP | 2004092906 A | 3/2004 |
| JP | 2008106085 A | 5/2008 |
| JP | 2010537061 A | 12/2010 |
| JP | 2015163816 A | 9/2015 |

OTHER PUBLICATIONS

Article: EVONIK Power to Create Titled: "Dynasylan Silane Information" Author: Jacob Shevrin et al Web: www.dynasylan.com.

* cited by examiner

FLEXIBLE WET FRICTION MATERIALS INCLUDING SILANES

TECHNICAL FIELD

The present disclosure relates to a wet friction material for clutch pads, in particular, a flexible wet friction material having higher performance characteristics, e.g., flexibility.

BACKGROUND

Known friction materials for clutches include a fibrous base material and a filler material. The fibrous base material forms a structure for the friction material and the filler material is configured to create friction. Known friction materials further include a binder, such as a phenolic resin. Phenolic resins are known to have a high crosslink density that could cause friction materials to become brittle. It is desired to enhance the flexibility of friction materials to reduce the possibility of glazing and hot spot formation.

SUMMARY

According to one embodiment, a method for forming a friction material is disclosed. The method includes mixing a fibrous base material and filler particles to form a substrate. The method further includes saturating the substrate with a silane solution including a silane to form a uniformly impregnated silane matrix. The method also includes curing the uniformly impregnated silane matrix to form a cured uniformly impregnated silane matrix. The method also includes saturating the cured uniformly impregnated silane matrix with a phenolic resin solution to form a uniformly impregnated silane, phenolic resin matrix. The method also includes curing the uniformly impregnated silane, phenolic resin matrix to form the friction material. The fibrous base material may have a porosity of 45 to 80%. In another variation, the fibrous base material may have a porosity of 50 to 65%. The first curing step may include curing the uniformly impregnated silane matrix at ambient temperature for 20 to 28 hours. The first curing step may include curing step includes curing the uniformly impregnated silane matrix at an elevated temperature for 8 to 12 minutes. The elevated temperature may be in a range of 80 to 120° C. The filler particles may be silica containing particles, which may be diatomaceous earth particles.

According to another embodiment, a method for forming a friction material is disclosed. The method includes mixing a fibrous base material and filler particles to form a substrate, saturating the substrate with a silane solution including a silane to form a uniformly impregnated silane matrix, curing the uniformly impregnated silane matrix to form a cured uniformly impregnated silane matrix, saturating the cured uniformly impregnated silane matrix with a non-silane binder solution to form a uniformly impregnated silane, non-silane matrix, and curing the uniformly impregnated silane, non-silane matrix to form the friction material. The silane may include an amino functional group and a silanol functional group. The silane solution may include an organic solvent. The fibrous base material may have a porosity of 45 to 80%. In another variation, the fibrous base material may have a porosity of 50 to 65%. The filler particles may be silica containing particles, which may be diatomaceous earth particles.

In another embodiment, a friction material for a clutch is disclosed. The friction material includes a fibrous base material, filler particles, a silane binder comprising 3 to 10 weight % based on a total weight of the friction material, and a non-silane binder comprising 25 to 32 weight % based on the total weight of the friction material. The silane binder may include an amino functional group and a silanol functional group. The non-silane binder may be a phenolic resin binder. The silane binder may include an organosilane binder. The fibrous base material and the filler particles may comprise 65 to 72 weight % based on the total weight of the friction material.

BRIEF DESCRIPTION OF THE DRAWINGS

The nature and mode of operation of aspects will now be more fully described in the following detailed description taken with the accompanying drawing figures, in which.

DETAILED DESCRIPTION

Figure 1:
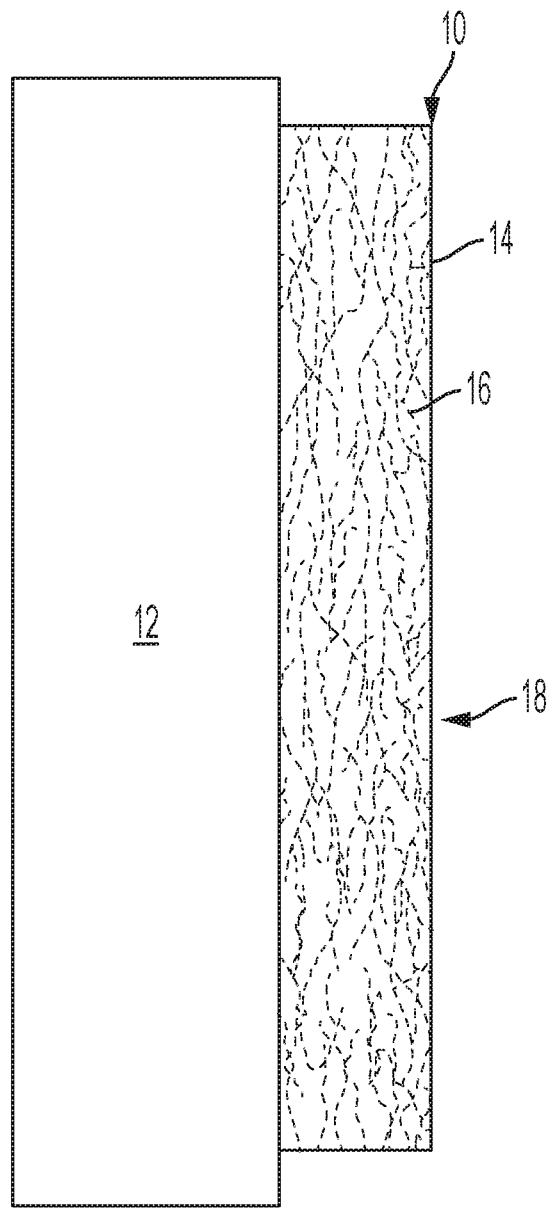
FIG. 1 illustrates a schematic cross-section view of a friction material used on a clutch plate according to an example aspect.

At the outset, it should be appreciated that like drawing numbers appearing in different drawing views identify identical, or functionally similar, structural elements. Furthermore, it is understood that this disclosure is not limited only to the particular embodiments, methodology, materials and modifications described herein, and as such may, of course, vary. As those of ordinary skill in the art will understand, various features illustrated and described with reference to any one of the figures can be combined with features illustrated in one or more other figures to produce embodiments that are not explicitly illustrated or described.

The terminology used herein is for the purpose of describing particular aspects only, and is not intended to limit the scope of the present disclosure, which is limited only by the appended claims. It is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.01%, 0.05%, 0.1%, 0.2%, 0.3%, 0.4%, or 0.5% of the value or relative characteristic.

Flexibility of wet friction materials is important to reduce the possibility of glazing and hot spot formation. Phenolic resin is a commonly used binder material for wet friction materials. Certain phenolic resins have a high crosslink density that may make the wet friction material become brittle. Known proposals use silane as an additional binder material to improve the flexibility of the friction material.

In certain applications, suitable pH conditions for silane curing is a pH less than 7. If the silane is cured under basic conditions (i.e., pH>7), the silane may rapidly gelate and crosslink with itself, thereby becoming less effective as a flexibility agent. Mixing a silane solution and a phenolic resin solution to form a binder material may cause the pH of the solution mixture to reach a pH of 8 or above. It is desired to provide a wet friction material production method that accommodates suitable pH conditions for silane curing. In one or more aspects, production methods and related wet friction materials are disclosed that improve the functionality of silane within wet friction materials (e.g., increasing the flexibility of wet friction materials).

With reference to FIG. 1, a cross-sectional view of friction material 10 is shown. Friction material 10 is used on clutch plate 12. Friction material 10 may be fixedly secured to plate 12. Friction material 10 includes fibrous base material 14. Fibrous base material 14 may be an organic or inorganic fiber, for example but without limitation, cellulose fibers, cotton fibers, aramid fibers, carbon fibers, or combinations thereof.

Friction material 10 also includes filler material 16. A filler material (e.g., filler particles) may be arranged for carrying a friction modifier and may be characterized as: (a) capable of having surface interactions with a friction modifier; (b) having a particle shape configured to carry a friction modifier; (c) having a particle size configured to carry a friction modifier; (d) having pores for carrying a friction modifier; or (e) any combination of (a) through (d). In an example aspect, the filler material may include silica. In an example aspect, the silica containing particles are useful to carry, to be available to, to attract, or to encapsulate a friction modifier.

A friction modifier may refer to an additive, component, or ingredient in automatic transmission fluid (ATF) as used in automotive components, such as wet clutches or torque converters. In one example aspect, the friction modifier is configured to provide compatibility between plates of a metal clutch and compatibility between the ATF and the wet clutch or the torque converter. Friction modifiers interact with metal surfaces with polar heads of the friction modifier bonding to the clutch metal surfaces and repulsive forces from the tails of the molecules, for example, aiding in separation of the metal surfaces.

Typical friction modifiers include fatty amines, fatty acids, fatty amides, fatty esters, paraffin waxes, oxidized waxes, fatty phosphates, sulfurized fats, long chain alkylamines, long chain alkylphosphites, long chain alkylphosphates, and borated long chain polars. In an example aspect, the friction modifier comprises a generally straight oleophilic tail portion including 10 to 24 carbons as well as an active polar head group portion. In another example aspect, the tail portion includes 18 to 24 carbons. The head portions form layers on the friction surfaces by surface absorption. Friction modifiers are configured to not corrode or cause degradation to the filler material or the clutch plate, which is typically made of steel. A non-limiting example of a friction modifier useful in an example aspect is octadecylamine.

In an example aspect, the filler material is comprised of silica containing particles. The silica containing particles may carry, be available to, attract or encapsulate a friction modifier. In one example aspect, the silica containing particles may be diatomaceous earth (DE) particles. DE is a natural silica source formed from sedimentation of single cell aquatic organisms called diatoms. DE can form in marine or fresh water environments and exhibit properties that are related to their unique shape and structure. These properties will vary according to the diatom species found in each deposit, each with differing chemistries, shape factors, and pore structures. Some non-limiting examples of silica containing carrier particles include Celite® 281, DiaFil® 230, and CelTiX™. Celite® 281 is a flux-calcinated diatomaceous earth of plankton marine diatomite. DiaFil® 230 is a natural diatomaceous earth material. CelTiX™ is a fine, natural freshwater diatomaceous earth product with excellent reinforcing ability in most types of elastomers. Silica is also referred to as silicon dioxide or $SiO_2$. The diatomaceous earth generally contains about ten percent other oxides besides silica and is substantially devoid of crystalline silica. Typically, diatomaceous earth is amorphous.

Friction material 10 also includes binder 18. Binder 18 may be phenolic resin. Phenolic resin upon curing forms water as a byproduct of a reaction between a phenol and a formaldehyde. Arofene® 295-E-50 is a non-limiting example of a phenolic resin that can be used with friction materials. Using phenolic resin as the binder may result in the friction material that is too stiff. A friction material that becomes too stiff may lead to poor performance and durability issues. To increase the flexibility of wet friction materials, phenolic resin is at least partially replaced by silane as a binder component in the wet friction material.

Figure 2:
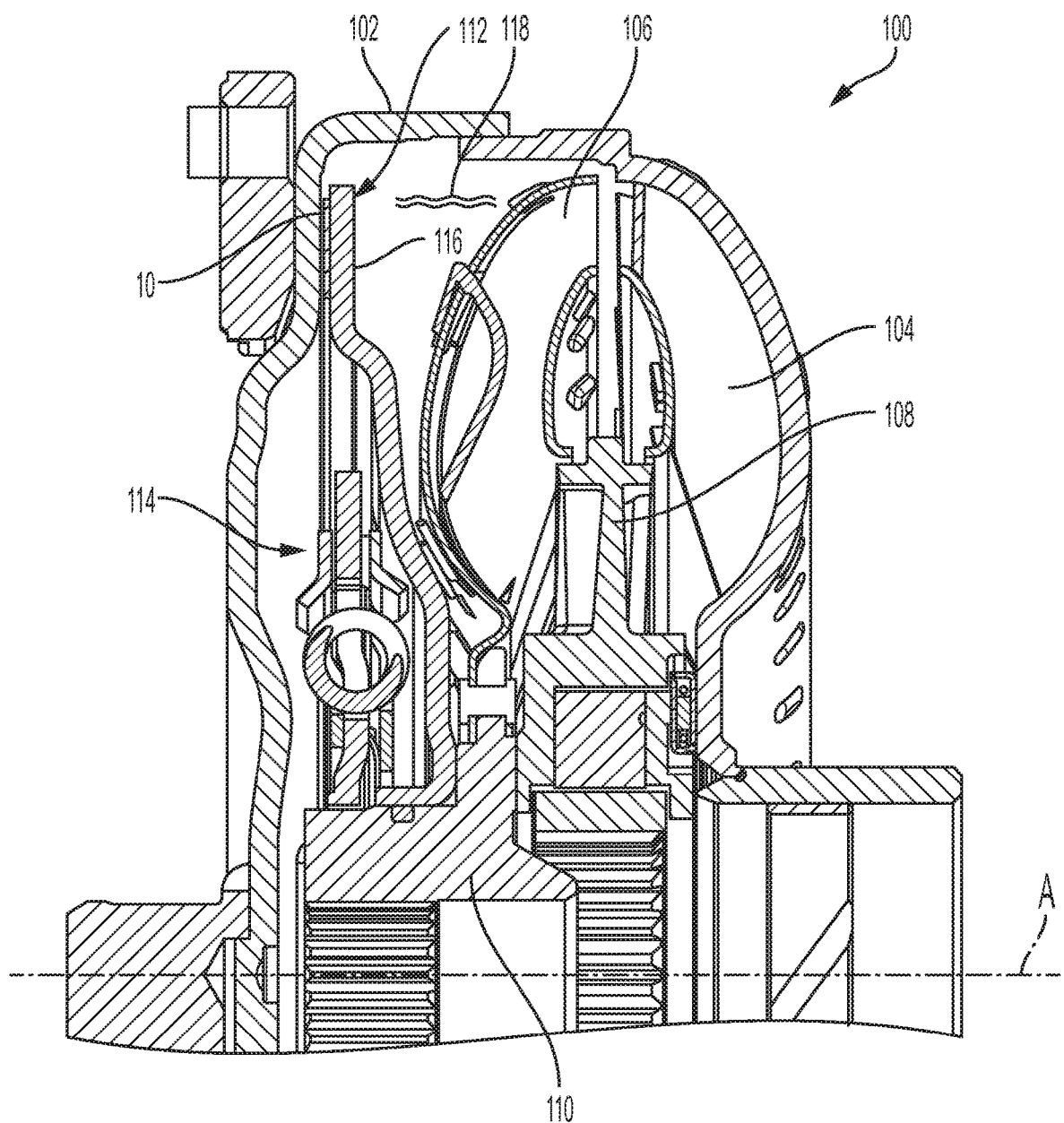
FIG. 2 illustrates a cross-sectional view of a torque converter having a friction material according to an example aspect.

FIG. 2 illustrates a cross-sectional view of torque converter 100 having friction material 10 according to an example aspect. Torque converter 100 includes cover 102, impeller 104 connected to cover 102, turbine 106 in fluid communication with impeller 104, stator 108, output hub 110 arranged to non-rotatably connect to an input shaft (not shown) for a transmission, torque converter clutch 112 and vibration damper 114. Clutch 112 includes friction material 10 and piston 116. Piston 116 is displaceable to engage friction material 10 with piston 116 and cover 102 to transmit torque from cover 102 to output hub 110 through friction material 10 and piston 116. Fluid 118 is used to operate clutch 112. Friction material 10 may be used in any clutch device for any torque converter configuration.

Figure 3:
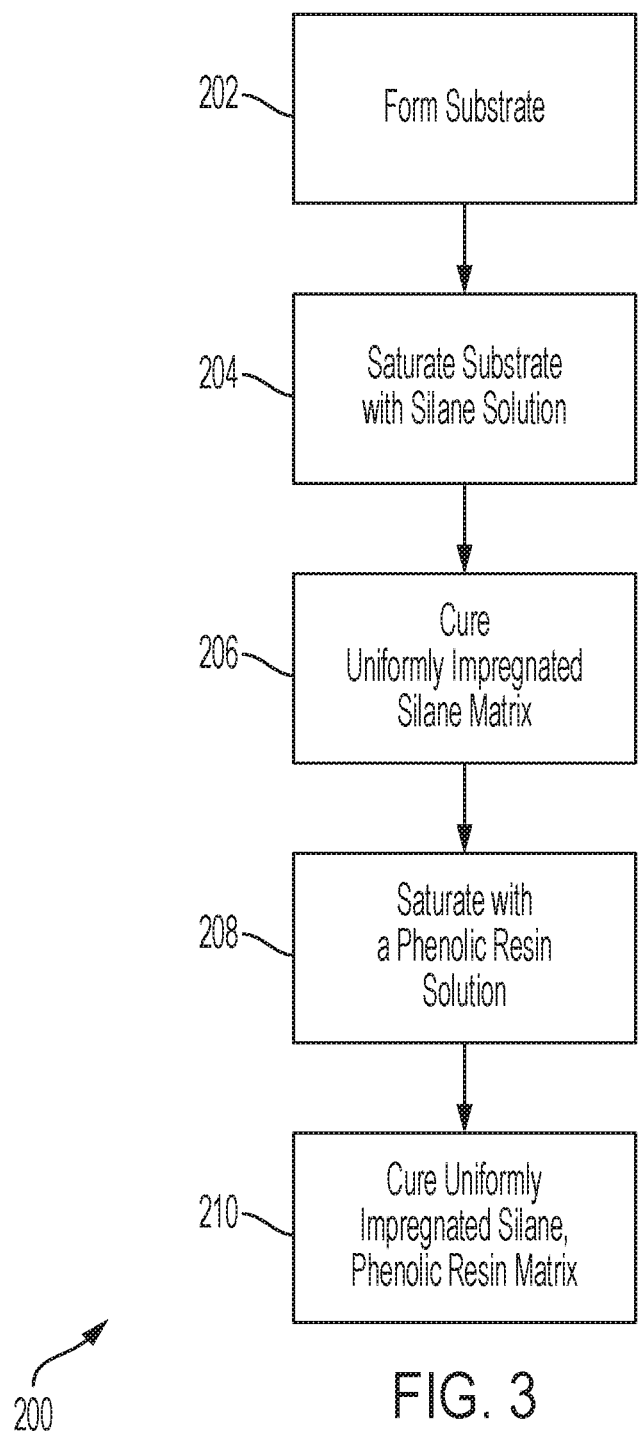
FIG. 3 illustrates a flowchart for a process of producing a friction material according to an example aspect.

FIG. 3 depicts a flowchart of process 200 that may be utilized to produce friction material 10. As shown in FIG. 3, process 200 includes multiple steps 202, 204, 206, 208 and 210. In certain aspects, one or more of these steps may be modified or omitted depending on the implementation.

In step 202 of process 200, a substrate is formed. The substrate may be formed by mixing a fibrous base material and filler particles. The porosity (e.g., void volume) of the fibrous base material may be any of the following values or within a range of any two of the following values: 45, 50, 55, 60, 65, 70, 75 and 80%. The fibrous base material may be an organic or inorganic fiber, for example but without limitation, cellulose fibers, cotton fibers, aramid fibers, carbon fibers, or combinations thereof. The filler material may be silica containing particles, e.g., DE particles.

In step 204 of process 200, the substrate is saturated with a silane solution including a silane to from a uniformly impregnated silane matrix. As used in one or more embodiments herein, uniformly impregnated refers to the substrate (or other impregnated material as disclosed herein) receiving a uniform amount (by volume or weight) of the silane solution (or other impregnating solution as disclosed herein) throughout the volume of the substrate (or other impregnated material). The uniform impregnation results in no substantial volume of the substrate (or other impregnated material) having a substantially higher or lower amount of the silane solution (or other impregnating solution) than the bulk volume of the substrate (or other impregnated material). In one or more embodiments, the uniform impregnation does not form a localized region, e.g., a surface coating of the silane solution (or other impregnating solution) or a silane (or other solid material in the impregnating solution) once cured. Rather, in these embodiments, the impregnating solution or solid material in the impregnating solution is substantially evenly distributed through the volume of the impregnated material.

In one aspect, the substrate does not include any other binder material, e.g., a phenolic resin, when step 204 is carried out. In one aspect, the silane solution only includes silanes and no non-silane binders, e.g., a phenolic resin. The absence of phenolic resin or other binders permits the pH of the silane solution to be less than 7. The acidic pH of the silane solution reduces crosslinking of the silane, thereby beneficially increasing the formation of bonds between the organic and inorganic materials within the friction material. Accordingly, reducing the crosslinking of the silane is a benefit of one or more aspects.

A silane is a monomeric silicon compound with four substituent groups attached to a silicon atom. These substituent groups can be nearly any combination of nonreactive, inorganically reactive, or organically reactive groups. Inorganic reactivity represents the covalent bonds formed through oxygen to the silicon atom to form a siloxane type of bond. Organic reactivity occurs on the organic portion of the molecule and does not directly involve the silicon atom. Silanes are useful in numerous applications as adhesion promoters, crosslinking agents, water scavengers, and/or coupling agents.

The silane solution may include an organic solvent (e.g., ethanol, methanol, methoxypropanol, ethylene glycol, toluene and tetrahydrofuran) and one or more silane compounds. Non-limited examples of silane solutions that may be utilized include Dynasylan® HYDROSIL 2627, 2776, 2909, 2926, 1151, 1153, 2907 and 2775, Dynasylan® F 8815, Dynasylan® VPS HYDROSIL 2990 and 2975, and Dynasylan® SIVO 110, 111, 112, 113, 121, 160, 140, 608 and 850, available from Evonik Corp. of Essen, Germany. In another embodiment, the silane solution may include an organic solvent and an aqueous solution including silane. The silane may have a stability of at least three (3) months in an aqueous solution having a pH of 3 to 5. The silane may be one or more of the following functional groups: amino, alkyl, silanol, diamino, diol, vinyl, triamino, fluoroalkyl, acrylic, acrylamide, quaternary ammonium and siliconate.

In step 206 of process 200, the uniformly impregnated silane matrix, which includes the silane solution, is cured. During the curing step, the pH of the silane solution may be any of the following values or within a range of any two of the following values: 3, 4, 5, 6 and 7. The conditions of the curing step may vary according to amount of silane solution and environmental conditions, for example. In one aspect, the uniformly impregnated silane matrix may be cured at ambient temperatures for a pre-determined amount of time. The predetermined amount of time may be any of the following values or within a range of any two of the following values: 20, 22, 24, 26 and 28 hours. In another aspect, the uniformly impregnated silane matrix may be cured at a predetermined elevated temperature for a predetermined amount of time. The predetermined elevated temperature may be any of the following values or within a range of any two of the following values: 80, 90, 100, 110 and 120° C. The predetermined amount of time may be any of the following values or within a range of any two of the following values: 8, 9, 10, 11 and 12 minutes. By curing the silane prior to the addition of the phenolic resin solution, the silane's functionality as a coupling agent with silica containing filler particles is enhanced. This enhancement provides good characteristics to the resulting wet friction material. In one embodiment, a glazing test is performed on the resulting friction material. The glazing test may be conducted on a S.A.E. No. 2 stand. According to the test, the friction material is slipped for a relative long period of time with a limited amount of ATF. The friction material fails by glazing when the surface temperature increased past a threshold temperature. By curing the silane prior to the addition of the phenolic resin solution, the lifetime of the friction material according to this glazing step may be increased by any of the following values or within a range of any two of the following values: 10, 20, 30, 40 and 50%.

In step 208 of process 200, the cured uniformly impregnated silane matrix is saturated with a phenolic resin solution. Non-limiting examples of solvents in the phenolic resin solution include ethanol, methanol and n-butanol. Arofene® 295-E-50 is a non-limiting example of a phenolic resin that can be used with friction materials. The weight % of phenolic resin in the phenolic resin solution may be any of the following values or within a range of any two of the following values: 47, 48, 49, 50, 51, 52 and 53 weight %.

In step 210 of process 200, the uniformly impregnated silane, phenolic resin matrix, which includes the phenolic solution, is cured. The conditions of the curing step may vary according to amount of phenolic resin solution and environmental conditions, for example. In one aspect, the uniformly impregnated silane, phenolic resin matrix may be cured at ambient temperatures for a pre-determined amount of time. The predetermined amount of time may be any of the following values or within a range of any two of the following values: 5, 10, 15, 20, 25 and 30 minutes. In another aspect, the uniformly impregnated silane, phenolic resin matrix may be cured at a predetermined elevated temperature for a predetermined amount of time. The predetermined elevated temperature may be any of the following values or within a range of any two of the following values: 150, 160, 170, 180, 190 and 200° C. The predetermined amount of time may be any of the following values or within a range of any two of the following values: 5, 10, 15, 20, 25 and 30 minutes.

The process of FIG. 3 may be used to produce a friction material for a clutch. In one aspect, the friction material includes a fibrous base material, filler particles, a silane binder and a non-silane binder. The weight % of silane binder in the friction material may be any of the following values or within a range of any two of the following values: 3, 4, 5, 6, 7, 8, 9 and 10 weight %. The weight % of non-silane binder (e.g., phenolic resin) in the friction material may be any of the following values or within a range of any two of the following values: 25, 26, 27, 28, 29, 30, 31 or 32 weight %. The weight % of the fibrous base material and the filler particles, cumulatively, may be any of the following values or within a range of any two of the following values: 65, 66, 67, 68, 69, 70, 71 and 72 weight %. The porosity (e.g., void volume) of the fibrous base material may be any of the following values or within a range of any two of the following values: 45, 50, 55, 60, 65, 70, 75 and 80%.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

Friction Material 10
Clutch Plate 12
Fibrous Base Material 14
Filler Material 16
Binder 18
Torque Converter 100
Cover 102
Impeller 104
Turbine 106
Stator 108
Output Hub 110
Clutch 112
Vibration Damper 114
Piston 116
Fluid 118
Process 200
Step 202
Step 204
Step 206
Step 208
Step 210

What is claimed is:

1. A method for forming a friction material comprising: mixing a fibrous base material and filler particles to form a substrate; saturating the substrate with a silane solution including a silane to form a uniformly impregnated silane matrix;
curing the uniformly impregnated silane matrix to form a cured uniformly impregnated silane matrix;
saturating the cured uniformly impregnated silane matrix with a phenolic resin solution to form a uniformly impregnated silane, phenolic resin matrix; and
curing the uniformly impregnated silane, phenolic resin matrix to form the friction material,
wherein the filler particles comprise a friction modifier, the friction modifier comprising an oleophilic tail portion with 10-24 carbons and an active polar head group portion.

2. The method of claim 1, wherein the fibrous base material has a porosity of 45 to 80%.

3. The method of claim 2, wherein the fibrous base material has a porosity of 50 to 65%.

4. The method of claim 1, wherein the first curing step includes curing the uniformly impregnated silane matrix at ambient temperature for 20 to 28 hours.

5. The method of claim 1, wherein the first curing step includes curing step includes curing the uniformly impregnated silane matrix at an elevated temperature for 8 to 12 minutes.

6. The method of claim 5, wherein the elevated temperature is in a range of 80 to 120° C.

7. The method of claim 1, wherein the filler particles further comprise silica containing particles.

8. The method of claim 7, wherein the silica containing particles are diatomaceous earth particles.

9. A method for forming a friction material comprising:
mixing a fibrous base material and filler particles to form a substrate; saturating the substrate with a silane solution including a silane to form a uniformly impregnated silane matrix;
curing the uniformly impregnated silane matrix to form a cured uniformly impregnated silane matrix;
saturating the cured uniformly impregnated silane matrix with a non-silane binder solution to form a uniformly impregnated silane, non-silane matrix; and
curing the uniformly impregnated silane, non-silane matrix to form the friction material,
wherein the filler particles comprise a friction modifier, the friction modifier comprising an oleophilic tail portion with 10-24 carbons and an active polar head group portion.

10. The method of claim 9, wherein the silane includes an amino functional group and a silanol functional group.

11. The method of claim 9, wherein the silane solution includes an organic solvent.

12. The method of claim 9, wherein the fibrous base material has a porosity of 45 to 80%.

13. The method of claim 12, wherein the fibrous base material has a porosity of 50 to 65%.

14. The method of claim 9, wherein the filler particles further comprise silica containing particles.

15. The method of claim 14, wherein the silica containing particles are diatomaceous earth particles.

* * * * *